(12) United States Patent
Hamada et al.

(10) Patent No.: US 6,603,950 B2
(45) Date of Patent: Aug. 5, 2003

(54) SHEET FEEDING APPARATUS AND IMAGE READING APPARATUS

(75) Inventors: Masataka Hamada, Kofu (JP); Motoaki Nakayama, Yamanashi-ken (JP); Osamu Jinza, Yamanashi-ken (JP)

(73) Assignee: Nisca Corporation, Yamanashi-Ken (JP)

( * ) Notice: Subject to any disclaimer, the term of this patent is extended or adjusted under 35 U.S.C. 154(b) by 0 days.

(21) Appl. No.: 09/989,691

(22) Filed: Nov. 21, 2001

(65) Prior Publication Data

US 2002/0067939 A1 Jun. 6, 2002

(30) Foreign Application Priority Data

Nov. 28, 2000 (JP) .......................................... 2000-360788

(51) Int. Cl.[7] .......................... G03G 15/00; G03B 27/62; H04N 1/04
(52) U.S. Cl. ........................... 399/367; 355/75; 358/498
(58) Field of Search ................................. 399/367, 374, 399/381; 355/75; 358/496, 498

(56) References Cited

U.S. PATENT DOCUMENTS

| | | | | |
|---|---|---|---|---|
| 4,505,575 A | * | 3/1985 | Palumbo | 355/75 X |
| 4,589,768 A | * | 5/1986 | Iwata et al. | 355/75 X |
| 4,853,750 A | * | 8/1989 | Murata et al. | 355/75 |
| 5,534,989 A | * | 7/1996 | Rubscha et al. | 399/381 |
| 5,826,155 A | * | 10/1998 | Kobayashi et al. | 399/367 |
| 6,215,548 B1 | * | 4/2001 | Ohlig | 355/75 |
| 6,324,362 B1 | * | 11/2001 | Yokoyama et al. | 399/367 X |
| 6,351,624 B1 | * | 2/2002 | Hiruta | 355/75 X |

FOREIGN PATENT DOCUMENTS

| | | | |
|---|---|---|---|
| JP | 2-215666 | * | 8/1990 |
| JP | 11-255391 | * | 9/1999 |

* cited by examiner

*Primary Examiner*—Fred L. Braun
(74) *Attorney, Agent, or Firm*—Kanesaka & Takeuchi

(57) ABSTRACT

A sheet feeding apparatus includes a transport unit to transport a sheet to an image reading position, and a support frame having a sheet stacker unit to store sheets, which are made of a plastic, and a hinge member is attached to the support frame for opening and closing the support frame. A motor mounting member for supporting a motor to provide a driving force to a transport member of the transport unit is attached to the support frame between the hinge member and the transport unit as a frame reinforcement. Also, the hinge member, motor mounting member and transport unit are fixed by a connecting member, and motors are arrange on both sides of the hinge member. The structure prevents deformation of a sheet feeding apparatus with a plastic frame and improves reading accuracy while being compact and lightweight.

16 Claims, 8 Drawing Sheets

SHEET FEEDING APPARATUS AND IMAGE READING APPARATUS

BACKGROUND OF THE INVENTION AND RELATED ART STATEMENT

1. Field of the Invention

This invention relates to a sheet feeding apparatus mounted to an image reading apparatus such as a copier, a facsimile, a printer or a scanner. More specifically, this invention relates to a sheet feeding apparatus comprising a support frame made of a plastic mounted to an upper portion of an image reading apparatus so that the sheet feeding apparatus can be freely opened and closed.

2. Description of the Prior Art

In a conventional image reading apparatus, in order to reduce a total apparatus weight, a frame is made of a plastic and provided with separating means to separate and feed sheets, transport means to transport the sheets to a platen on an image reading apparatus and a motor to drive these means. The frame is attached to a main body of the image reading apparatus by a hinge, which is disclosed in detail in Japanese Utility Model No. 2582475. The hinge has a spring that urges the frame in an opening direction so that the frame is freely opened and closed.

However, in the sheet feeding apparatus mentioned above, particularly in a flow-type sheet feeding apparatus wherein scanning means of an image reading apparatus is stationary and an image on a sheet is read while an original document is moving, a problem arises in that a proper reading of the original document is not made because of disturbance to an image upon scanning if a distance between a platen glass and the original document is not constant.

This is described in detail with reference to FIG. 7 and FIG. 8. FIG. 8 shows a sheet feeding apparatus mounted to an image reading apparatus via a hinge H provided with a spring S that urges the feeding apparatus in an opening direction. As shown in FIG. 8, when the sheet feeding apparatus A is closed over the image reading apparatus, it transports a sheet of paper to a platen glass G. Scanning means, not shown in the drawing, positioned below the platen glass G reads an image on the sheet as the sheet is transported over the platen glass G.

At this time, to maintain a constant distance between the platen glass G and a sheet guide SG that guides the sheet, positioning protrusions P1 and P2 are mounted at both edges of the sheet feeding apparatus A perpendicular to the sheet transport direction. The positioning protrusions P1 and P2 protrude toward the platen glass G beyond the sheet guide SG to abut against the platen glass G.

However, as shown in FIG. 8, if the frame of the sheet feeding apparatus A is made of a lightweight material such as a plastic, the frame tends to bend near a mounting position of the sheet feeding apparatus A on the hinge apparatus H, thus only the positioning protrusion P1 abuts against the platen glass G, and the positioning protrusion P2 does not. In such a state, when a sheet is transported to the platen glass G, a gap between the scanning means and the original document is not maintained within a constant range, thereby causing distortion in an image.

In the particular case shown in FIG. 8, when the spring S in the hinge H urges the feeding apparatus A in the opening direction, a permanent deformation will develop in the frame over a long period of time because of the constant urging stress.

As a solution of this problem, for example, height adjustment means HA comprising a spring is disposed in the mounting member HT as shown in FIG. 8. The height adjustment means HA lowers a side of the sheet feeding apparatus A where the positioning protrusion P2 is disposed. However, while the height adjustment means HA works to some extent, an adjustment will no longer work when the frame itself is deformed.

On the other hand, it would be possible to make the frame body of a rigid material such as steel, but a frame made of steel increases cost and weight.

OBJECT OF THE INVENTION

In view of the aforementioned problems, an object of the present invention is to provide a sheet feeding apparatus provided with a frame made of a plastic with reinforcement to have enough rigidity to properly transport original documents without distortion of an image thereon.

The second object of the present invention is to provide a sheet feeding apparatus using a motor attachment member as a frame reinforcement member to reduce a cost.

The third object of the present invention is to provide a compact and lightweight sheet feeding apparatus with specially designed hinge members and motors.

Further objects and advantages of the invention will be apparent from the following description of the invention.

SUMMARY OF THE INVENTION

In order to attain the aforementioned objectives, the present invention provides a sheet feeding apparatus disposed on an image reading apparatus so that the sheet feeding apparatus can be opened and closed freely. More specifically, the sheet feeding apparatus comprises transport means for transporting sheets to a reading position; a support frame made of a plastic for supporting the transport means; a sheet stack unit for storing sheets disposed in the support frame; a hinge member mounted to the support frame; and a motor mounting member to support a motor that drives the transport unit. The motor mounting member is disposed in the support frame between the hinge member and the transport member as a reinforcement member.

Furthermore, the sheet feeding apparatus of the present invention is equipped with an adjustment member on the hinge member or between the hinge member and a main body of an image reading apparatus to adjust the height of the reading position and the transport member.

Also, the hinge member and the motor mounting member are connected by a connecting member.

Furthermore, the sheet feeding apparatus of the invention has a first connecting member for connecting the hinge member and the motor mounting member, and a second connecting member for connecting the motor mounting member and the transport member. The sheet feeding apparatus also has a transmission member to transmit motor drive to the transport member disposed between the motor mounting member and transport member.

The sheet transport apparatus of the invention comprises a transport member to transport sheets to the first reading section on an image reading apparatus unit; a sheet pressing plate to press sheets onto a second reading section on the image reading apparatus unit disposed adjacent to the first reading section; a support frame made of a plastic to support the transport member and the sheet pressing plate; a first hinge member mounted to the support frame on the transport member side and a second opening; and a second hinge member mounted to the support frame on the pressing plate side. The motor mounting member is disposed in the support frame between the first hinge member and the transport member as a reinforcement member. The sheet transport apparatus is also provided with a connecting member to connect the first hinge member and the motor mounting member at an upper portion of the support frame.

According to the present invention, because the mounting member for supporting the motor that drives the transport member is attached to the frame as a reinforcement member, even if the frame is made of a plastic, it reinforces a portion of the frame that affects the reading accuracy. Therefore, no other special reinforcement means is needed, so that the invention can provide a sheet feeding apparatus that can properly read originals.

Also, because the closing means and the motor mounting member are connected, the frame reinforcement is more enhanced.

Also, because the motor drive transmission means is disposed between the motor mounting member and the transport member, further frame reinforcement and effective use of space are possible.

In addition, this invention provides a sheet feeding apparatus comprising a transport member to transport sheets to a reading position to real images; a support frame made of a plastic including a sheet stacker for storing sheets; a hinge member that can open and close the support frame on an image reading apparatus unit attached between the transport member side and the sheet stacker side; a first motor to drive the transport member to transport sheets to a predetermined position disposed between the transport member and the hinge member on the transport member side; a second motor to drive the sheets from the predetermined position; a motor mounting member to support the first and second motors attached to the support frame as a reinforcement member. The first and second motors are disposed on both sides of the hinge member of the transport member.

In addition, the hinge member on the transport member side of the sheet feeding apparatus and the first and second motors are disposed to overlap each other in the height direction.

The hinge member on the transport member side of the sheet feeding apparatus is provided with an elastic member urging the sheet feeding apparatus in the opening direction. The hinge member on the sheet stacker side is provided with an elastic member that has an elastic force lower than that of the hinge member on the transport member side.

In addition, the hinge member on the transport member side of the sheet feeding apparatus according to the invention is provided with an elastic member urging the sheet feeding apparatus in the opening direction, and the hinge member on the sheet stacker side is not provided with an elastic member.

Thus, according to the invention, because the motor mounting member is also a reinforcement member, the frame has a stable balance without a twisting or deformation thereof when closing. Thus, it is possible to provide a sheet feeding apparatus that can properly read images.

Also, because the closing means and motors are overlapped in the height direction, it is possible to reduce a size of the sheet feeding apparatus in the height direction thereby attaining a compact and lighter structure for the overall apparatus.

Also, because the motors are disposed on both sides of the one of the closing means, a weight balance is stable.

Furthermore, it is possible to lower the elastic force of the closing means of the other side or to omit it altogether, thereby providing a sheet feeding apparatus that reduces the cost without a decrease in reading accuracy.

It is obvious that any image reading apparatus equipped with the sheet feeding apparatus of the invention can attain the same effects.

BRIEF DESCRIPTION OF THE DRAWINGS

FIG. 5 is an enlarged view of a motor and other parts near a main hinge 2a;

DETAILED OF THE PREFERRED EMBODIMENTS

Hereunder, embodiments of the invention will be explained with reference to the accompanied drawings.

Figure 1:
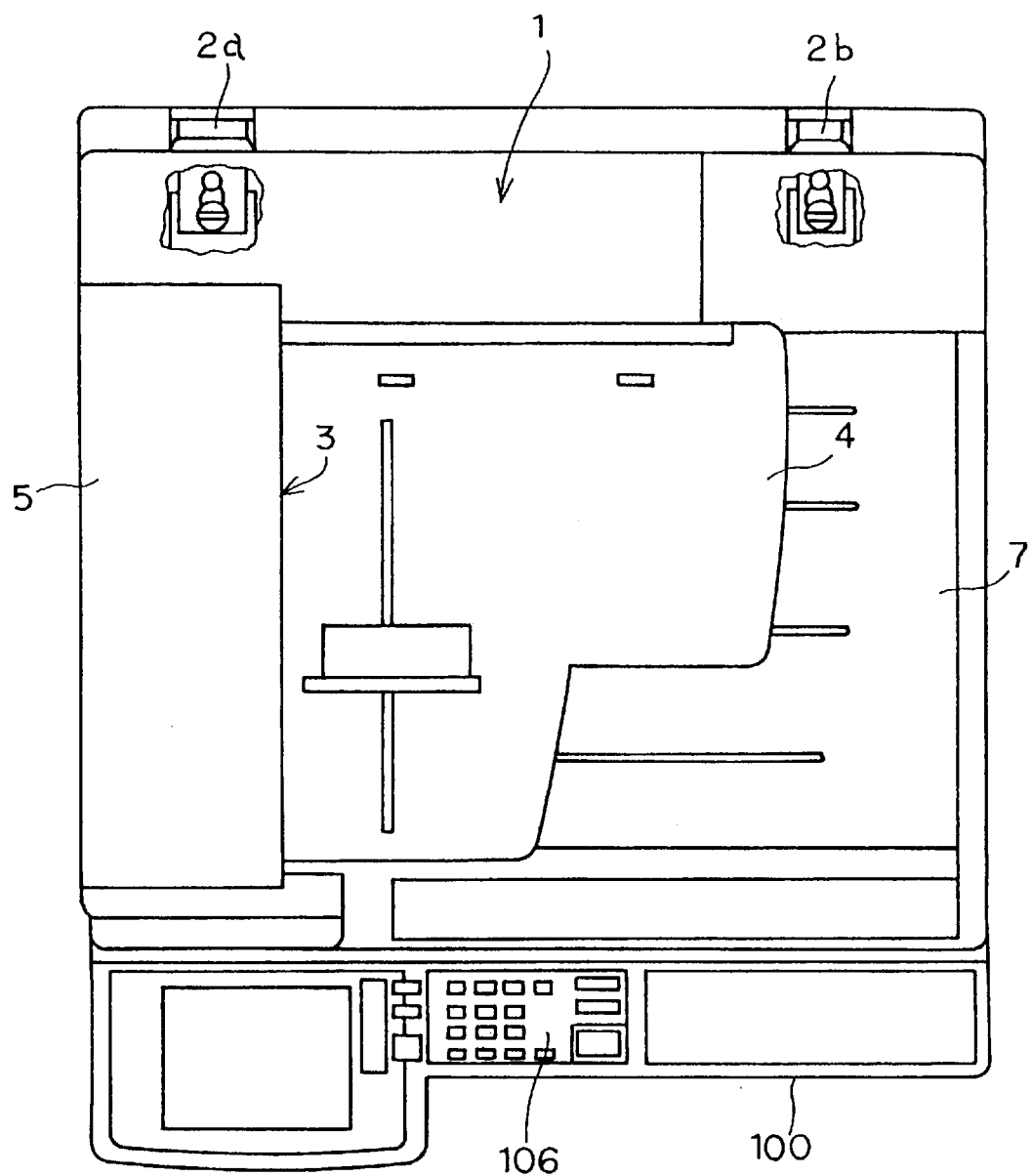
FIG. 1 is a top plan view of an automatic document feeder employing a preferred embodiment of a sheet feeding apparatus according to the invention mounted to an image reading apparatus 100.
Figure 2:
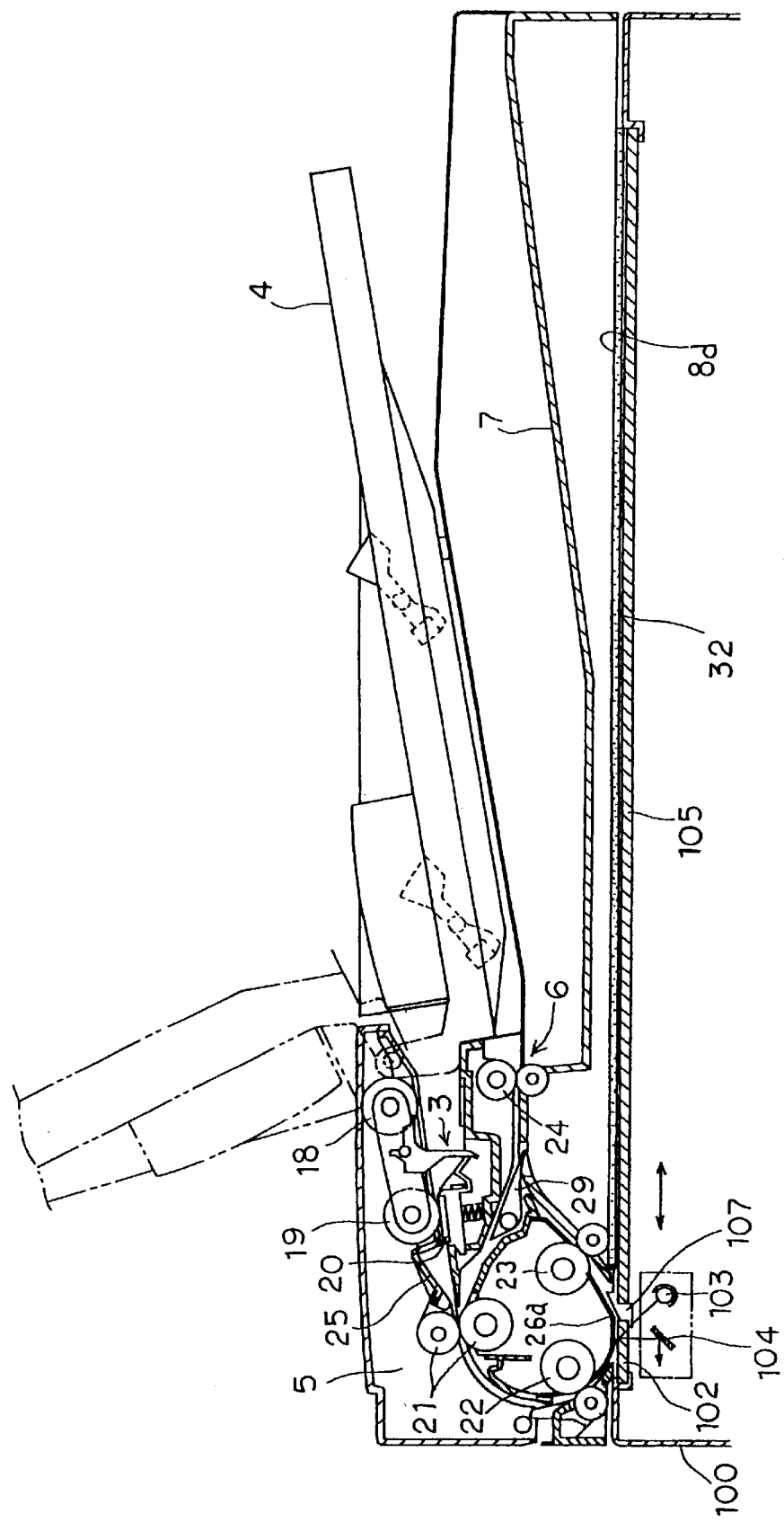
FIG. 2 is a sectional view of the image reading apparatus 100 shown in FIG. 1.
Figure 3:
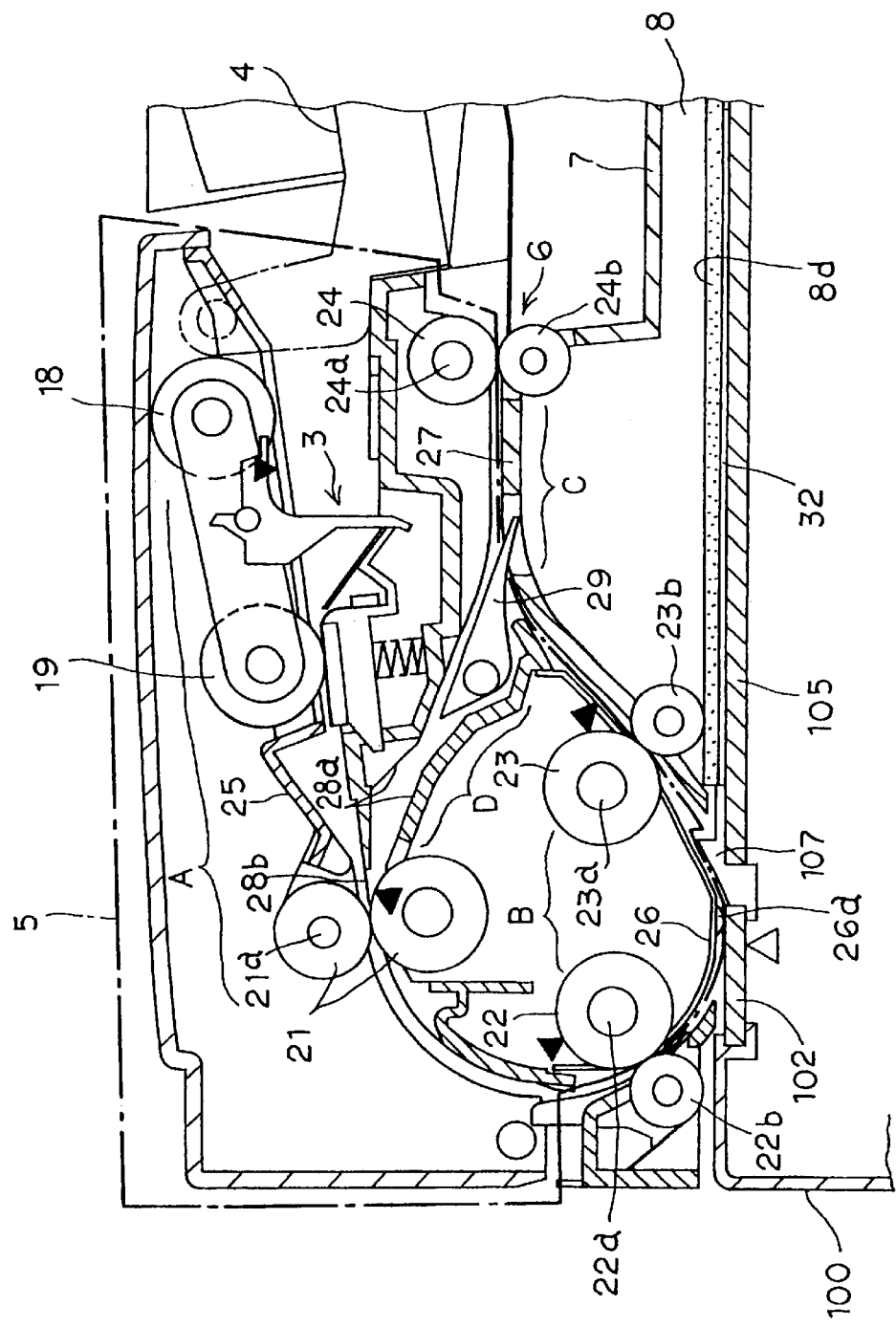
FIG. 3 is an enlarged view of a transport unit of the automatic document feeder apparatus 1.

FIG. 1 is a top view of an automatic document feeder employing a preferred embodiment of a sheet feeding apparatus according to the present invention mounted to an image reading apparatus 100. FIG. 2 is a sectional view of the image reading apparatus 100 shown in FIG. 1., and FIG. 3 is an enlarged view of a transport unit of the automatic document feeder apparatus 1.

As can be seen in FIG. 1 and FIG. 2, the automatic document feeder apparatus 1 is mounted and disposed on the image reading apparatus 100 of the present invention.

The automatic document feeder apparatus 1 transfers originals to pass over a first platen glass 102 on the image reading apparatus 100. The apparatus unit 100, as is shown in FIG. 2, irradiates light from a light source 103, such as a lamp, onto the transported original through the platen glass 102. A mirror 104 to read an image on the original reflects the light, and then the image is photo-electrically converted by reading means such as a CCD, which is not shown in the drawing.

Namely, an upper surface of the platen glass 102 forms a reading station of the image reading apparatus 100, but in this case, the light source unit comprising the light source 103 and the mirror 104 is set to be stationary at the reading position to read originals transported sequentially over the platen glass 102.

Note that the image reading apparatus 100 is also equipped with a second platen glass 105 upon which an original or book can be manually placed. In this case, the light source is moved in a scanning direction of the second platen glass 105 to read the original through the platen glass 105.

Also, according to the preferred embodiment, although the first platen glass 102 and the second platen glass 105 are used, it is also possible to use a single platen glass to stabilize the light source to read originals transported or to move the light source to read stationary originals.

The automatic document feeder apparatus 1 can be closed over the image reading apparatus 100 by a pair of hinges 2a and 2b as hinge members on the image reading apparatus 100 formed at the back side with the operation panel 106 on the image reading apparatus 100 as the front operating side (see FIG. 1). Opening and closing are performed to remove jammed originals transported to the first platen glass 102 or to easily open the platen glass on the image reading apparatus 100 around the hinges 2a and 2b on the back of the machine to read a book type original.

Also, the automatic document feeder apparatus 1 comprises a paper stacker 4 to support originals with a certain angle (approximately 10°) with a paper feed inlet 3 at a lower end and the back side thereof (the hinge 2b in the drawing) at a higher end; a document transport unit 5; and a discharge stacker 7 to store the originals discharged from a discharge outlet 6. The document transport unit 5 further comprises a paper feed unit A to separate the originals into a single sheet and feed them toward the first platen glass 102; a transport unit B to pass the originals over the first platen glass 102 surface; and a discharge unit C to receive the originals passing over the first platen glass 102 to discharge them from the discharge outlet 6.

Next, the transport unit 5 that feeds, transports and discharges the originals on the paper stacker 4 will be explained according to FIG. 2 and FIG. 3.

Note that the transport unit 5 is constructed as a unit so that the area surrounded by chain lines with dots in FIG. 3 can be mounted to a frame 8.

The paper feed unit A with the paper feed inlet 3 comprises a draw-out roller 18 that moves up and down and contacts a sheet stacked on the paper stacker 4 to pull out the sheet; a feed roller 19 to feed sheets pulled out by the draw-out roller 18; separation means including a separation pad 20 that allows only the first sheet to pass through and stops the feeding of the second and subsequent sheets; a register guide 25 and register rollers 21 to feed the sheet further downstream to the original reading position on the first platen glass 102 after abutting against the leading edge of the first original separated by the separation means to align the leading edge.

The transport unit B has two transport rollers. The first transport roller 22 is provided at upstream of the first platen glass 102, and comprises a drive shaft 22a to feed the originals to the first platen glass 102. The second transport roller 23 is provided at downstream of the first platen glass 102, and comprises a drive shaft 23b to discharge the originals downstream from the first platen glass 102. The originals are transported and guided by the platen glass 102 on the image reading apparatus 100, the lifting guide 107 and a backup guide 26a disposed at the automatic document feeder apparatus 1.

The backup guide 26a is disposed on both sides of the original transport region. The positioning protrusions 26b ensure an original path by abutting against the platen glass 102.

The discharge unit C with the discharge outlet 6 comprises a transport guide 27 to transport the originals discharged from the first platen glass 102 by the downstream side transport roller 23; and a discharge roller 24 having a drive shaft 24a to discharge the originals to a discharge stacker 7.

The frame 8, which is described later, has pinch rollers 22b, 23b and 24b disposed at opposite positions to the upstream transport roller 22, the downstream side transport roller 23 and the discharge roller 24, respectively.

The automatic document feeder apparatus 1 of the preferred embodiment has a duplex mode where the original is sent back to the first platen glass 102 to read the other side (the back side of the original). For this purpose, a switchback unit D is provided on the transport unit 5.

After a trailing edge of the original, one side thereof having been read, passes a switching flapper 29 in a process to be discharged toward the discharge stacker 7 by the discharge roller 24, the discharge roller 24 is reversed thereby returning the original over the flapper 29, and then the leading edge of the original passing a switchback guide 28a reaches a register roller 21.

In other words, the discharge roller 24, the flapper 29 and the switchback guide 28a constitute a switchback mechanism D.

Also, as shown in FIG. 3, the flapper 29 is constantly urged downwardly by an elastic member, such as a spring. The leading edge of an original pushes up this flapper 29 against the urging force to be transported. Also, at a position where the path to separate and feed by the paired register rollers 21 and the switchback path meet each other, a Mylar sheet 28b to lead the original to the nip of the paired register rollers 21 is disposed.

Next, a description of a frame structure of the automatic document feeder apparatus 1 and a motor mounting will be explained according to FIG. 4 and FIG. 6.

Figure 4:
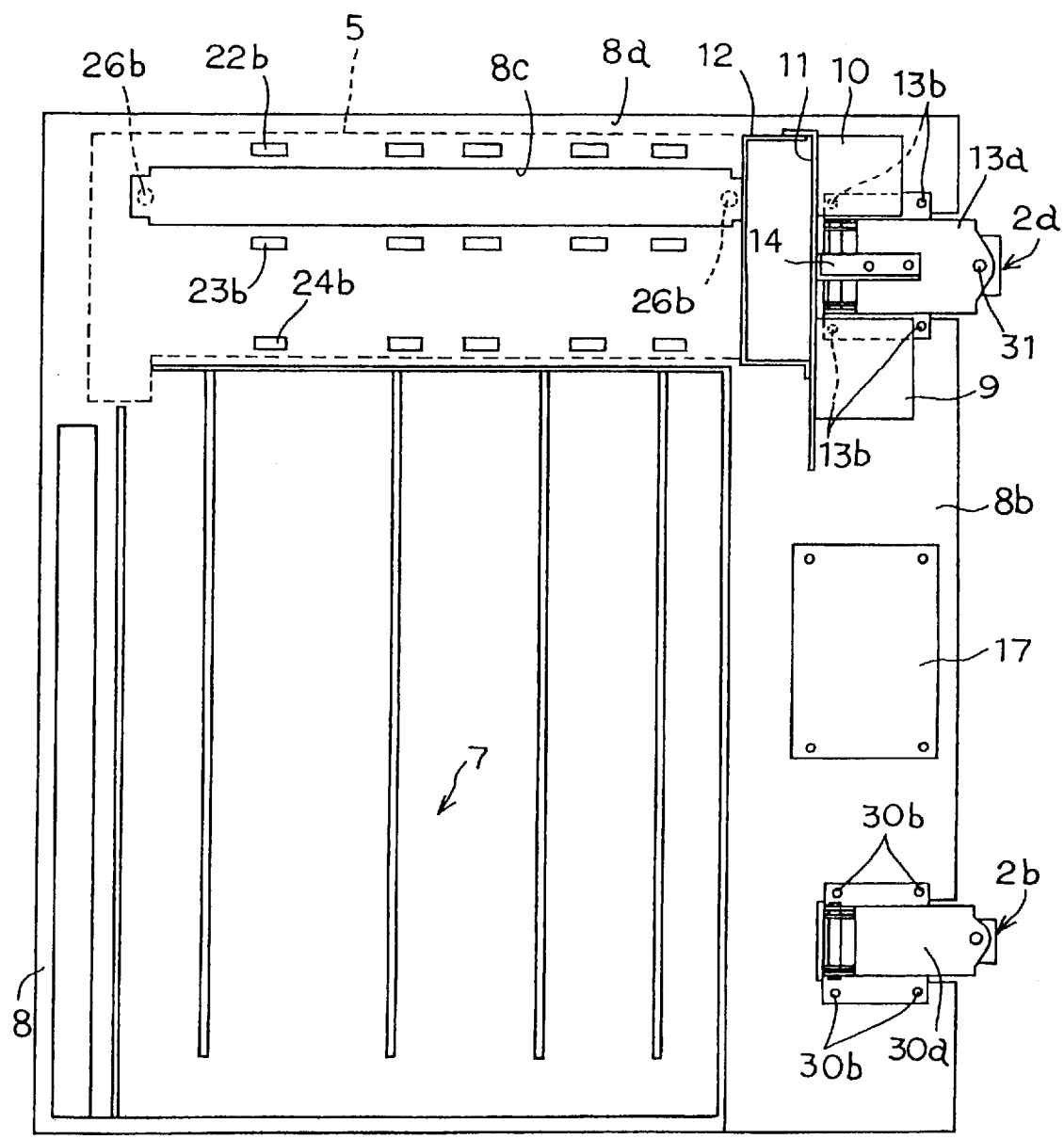
FIG. 4 is a plan view of a frame without a transport unit 5 of the automatic document feeder apparatus 1 in FIG. 1 and a stacker 4 mounted thereupon.
Figure 5:
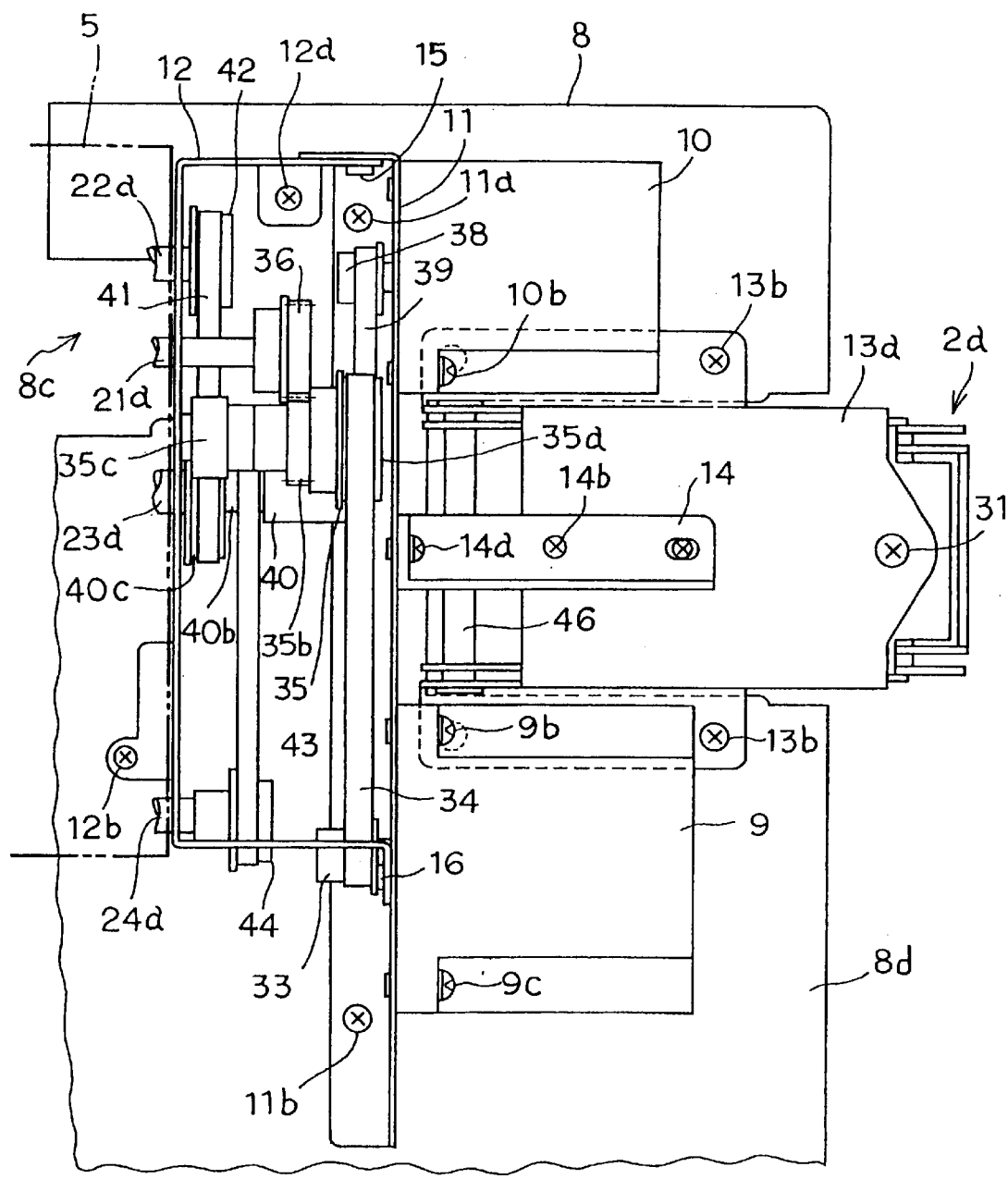

FIG. 4 is a plan view of a frame without the transport unit 5 of the automatic document feeder apparatus 1 in FIG. 1 and the stacker 4 mounted thereon. FIG. 5 is an enlarged view near the main hinge 2a of the motor, and FIG. 6 is a rear view from the main hinge 2a shown in FIG. 5.

First, in FIG. 4, the frame 8 is made of a plastic integrated with the discharge stacker 7. An alloy of polycarbonate and polystyrene or acrylonitrile-butadiene resin can be used as the plastic, but not limited thereto. The frame 8 made of a plastic is provided with a transport unit arrangement unit 8a and a drive arrangement unit 8b. The transport unit arrangement unit 8a includes the transport unit 5 attached on the main hinge 2a side on a periphery of the discharge stacker 7. The drive arrangement unit 8b includes, on the main hinge 2a side, a separation feed motor 9, a transport motor 10, and a power control printed circuit board 17 that provides power supply and control for these.

Also, as shown in FIG. 2, at the back side of the discharge stacker 7 on the frame 8, there is disposed a pressure plate support unit 8d to support a pressure plate 32 that presses the original against the second platen glass 105 when reading a manually placed original on the second platen glass 105. A supplementary hinge 2b is fastened to the frame 8 on the pressure plate support unit 8d side.

Although not shown in the drawings, lattice ribs are disposed on the transport unit arrangement unit 8a in the frame 8, the drive arrangement unit 8b and the back side of the discharge stacker 7 to increase rigidity of the frame 8.

Also, the transport unit arrangement unit 8a is provided with a reading aperture 8c that extends traverse to the original transport direction. The positioning protrusions 26b protrude from the transport unit 5 side. As is clearly shown in FIG. 5, between the reading aperture 8c on the drive arrangement unit 8b and the main hinge 2a, the motor mounting member 11, to which the separation feed motor 9 and the transport motor 10 are mounted, is fastened to the frame 8 by screws through mounting holes 11a and 11b. The mounting hole 11a at the separation and feed motor side and the mounting hole 11b at the transportation motor 9 side are shown in the drawing. It is also possible to use more than two mounting holes to fasten the motor mounting member 11.

Furthermore, a transport unit mounting member 12 fixed to the frame 8 is mounted to the side of the reading unit 5 between the motor mounting member 11 and the reading aperture 8c. The transport unit mounting member 12 is fastened to the frame 8 by screws through a mounting hole 12a near the mounting hole 11a of the motor mounting member 11 and a mounting hole 12b near the pinch roller 24b of the transport motor 5.

This transport unit mounting member 12 is also fastened at two places to the frame 8 through the mounting holes 12a and 12b. It is also possible to fasten it in more than two places.

The motor mounting member 11 substantially forms an L shape, and the transport unit mounting member 12 forms an angle as shown in FIG. 5. They form a box shape and are connected together by screws via a second connecting portion 15 and a third connecting portion 16.

The main hinge 2a is fastened to the frame 8 by a main hinge mounting plate 13, which is formed of an angled metal plate, from an upper side using screws through mounting holes 13b. Similarly to the main hinge 2a, as shown in FIG. 4, the supplementary hinge 2b is fastened to the frame 8 by a main hinge mounting plate 30a, which is formed of an angled metal plate, from an upper side using screws through mounting holes 30b.

The side of the main hinge 2a carries heavier weight, since such heavy parts as the transport unit 5, the feed roller 19, the transport rollers 22 and 23, the separation feed motor 9 and the transport motor 10 are disposed on the side of the main hinge 2a. For that reason, though not shown in the drawings, a spring with a higher elastic force is disposed in the main hinge 2a to apply an opening force. On the other hand, as the supplementary hinge 2b is required to support only the discharge stacker 7 and the pressure plate 32, a spring having a lower elastic force is used.

An elastic force of the spring in the main hinge 2a is based on a weight of the automatic document feeder apparatus 1. When the automatic document feeder apparatus 1 is opened, it is preferred that the main hinge 2a can hold the automatic document feeder apparatus 1 at a degree that the automatic document feeder apparatus 1 does not close by its own weight. According to this embodiment, a preferred elastic force is the maximum torque of 150 Kgf/cm. However, this value should be adjusted depending on a weight of the automatic document feeder apparatus 1.

Furthermore, according to this embodiment, in the main hinge 2a and the supplementary hinge 2b, there are total two springs to apply an opening force. However, by adjusting the center of gravity for the entire automatic document feeder apparatus 1, it is possible that only the main hinge 2a is needed, resulting in omitting a spring in the supplementary hinge 2b.

Because a spring with a relatively higher elastic force is disposed in the main hinge 2a, the spring force is applied on the hinge mounting portion in an opening direction of the frame 8. As s result, there is a concern that the frame will bend or deform in between the reading aperture 8c and the main hinge 2a over a long period of time. According to this embodiment of the present invention, as can be clearly seen in the FIG. 5, the main hinge mounting member 13a and the motor mounting member 11 are connected by a first connecting member 14 formed of metal having a sectional L shape.

In other words, a mounting part 14a of the first connecting member 14 is fastened to the motor mounting member 11 by a screw, rivet or the like. A mounting part 14b of the first connecting member 14 is fastened to the main hinge mounting member 13a in the same way.

Therefore, the motor mounting member 11 and the transport unit mounting member 12, both being formed of metal, are fastened to the frame 8 so they reinforce the frame 8 to prevent bending or deformation.

Also, a height adjustment screw 31 is disposed to the hinge to make sure that the positioning protrusions 26b on the transport unit side contact the platen glass 102 when the automatic document feeder apparatus is closed. The height adjustment screw adjusts a height of the frame 8 with regard to the platen glass 102 so that the positioning protrusions 26b on the main hinge side touch the platen glass 102. It is also acceptable to use another adjustment device disposed between the main hinge 2a and the reading apparatus unit instead of the adjustment screw 31.

The main hinge 2a is fastened to the frame 8 and the motor mounting member 11, and the motor mounting member 11 is fastened to the main hinge 2a, frame 8 and the transport unit mounting member 12. Also, the transport unit 5 is connected to the frame 8 and the transport unit mounting member 12.

The main hinge 2a and the transport unit 5 are connected together by metallic members, and further connected to the frame 8. Therefore, even if the frame 8 is made of a plastic, there is sufficient reinforcement in such portions that are critical to the accuracy of reading. The positioning protrusions 26b securely touch the platen glass 102 within the adjustment range of the height adjustment screw 31.

In addition, the first through the third connecting member is attached to the frame to further increase a strength against a deformation of the frame 8.

Next, as shown in FIG. 5, according to this embodiment of the invention, a gear and a timing belt are disposed between the motor mounting member 11 and the transport unit mounting member 12 attached to the motor mounting member 11 at both ends. The gear and the timing belt transmit driving force of the separation feed motor 9 and the transport motor 10 to the transport unit 5. The mounting members arranged angularly further reinforce the strength of the frame 8, and the box structure creates a space that can be used for other purposes.

In FIG. 5, the drive of the separation feed motor 9 mounted to the motor mounting member 11 is transmitted to a separation feed motor drive distributor pulley 35 from the separation feed motor pulley 33 mounted to an output shaft of the separation feed motor 9 via the timing belt 34. The separation motor drive distributor pulley 35 is attached to the transport unit mounting member 12, and is provided with a drive receiving gear 35a, a transmission gear 35b, a draw-out roller 18 (not shown in FIG. 5) and a transmission gear 35c that engages a transmission member of the feed roller 19. The transmission gear 35c engages a register roller transmission gear 36 with a one-way clutch, which is not shown in the drawings, to drive a register roller shaft 21a.

The separation feed motor 9 provides both forward and reverse rotations. However, by using a one-way clutch, which is not shown in the drawings, the rotational direction can be switched. The separation feed motor 9 rotates in one direction to drive the draw-out roller 18 and the feed roller 19 in the sheet feeding direction. The separation feed motor 9 also rotates in the other direction to drive the register roller shaft 21a and the paired register rollers 21 in the sheet transport direction.

Next, the drive of the separation feed motor 9 mounted to the motor mounting member 11 is transmitted from the separation feed motor 38 to a separation motor drive distributor pulley 40 located below the separation motor drive distributor pulley 35 in FIG. 5 by a timing belt 39. The separation motor drive distributor pulley 40 is integrated with a drive reception gear 40*a* and timing gears 40*b* and 40*c* (not shown in the drawings) to receive the drive of the timing belt 39 on the downstream side transport roller 23 in the transport unit 5. The separation motor drive distributor pulley 40 drives the drive shaft 23*a*.

The drive of the separation motor drive distributor pulley 40 is transmitted from the timing gear 40*c* to a drive reception gear 42 connected to a drive shaft 22*a* of a transport roller 22 by a timing belt 41. The drive of the separation motor drive distributor pulley 40 is also transmitted from the timing gear 40*b* to the drive reception gear 44 connected to a discharge drive shaft 24*a* of a discharge roller 24 by a timing belt 43. The transport motor 10 rotates in forward or reverse as required to read a front side and a backside of the original. The drive of the transport motor 10 is transmitted to the transport roller 22, a downstream side transport roller 23 and the discharge roller 24 via the transmission system just described.

Figure 6:
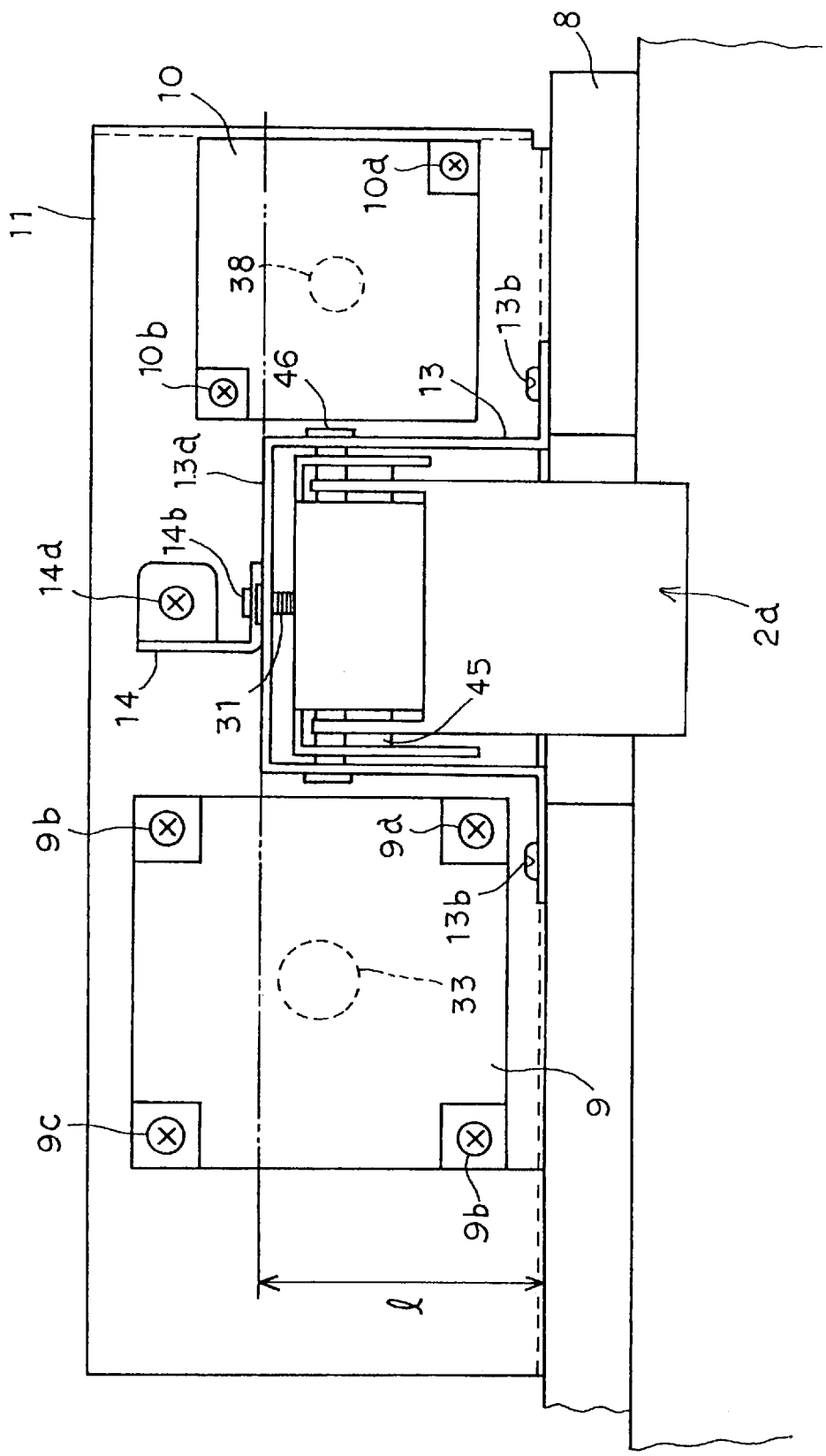
FIG. 6 is a rear view from the main hinge 2a shown in FIG. 5.
Figure 7:
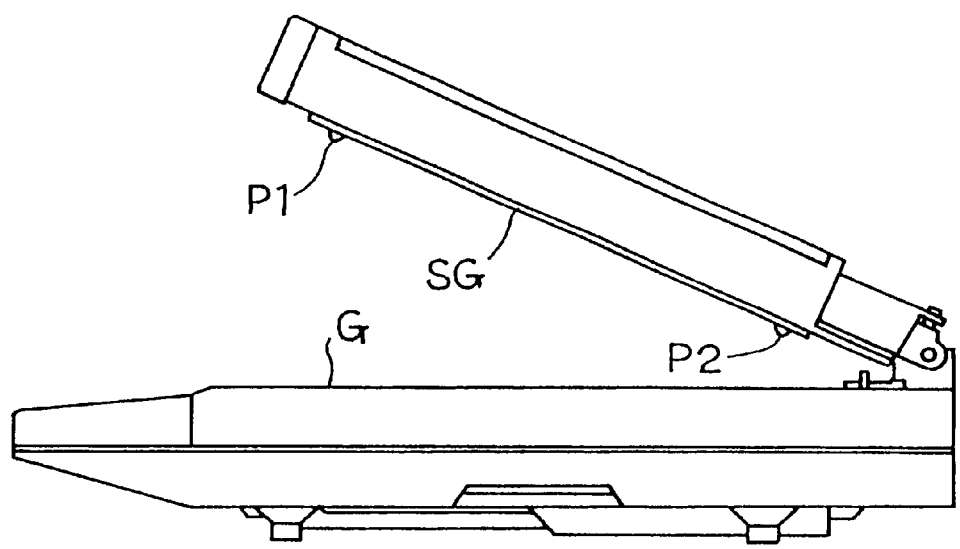
FIG. 7 is a drawing of the prior art.
Figure 8:
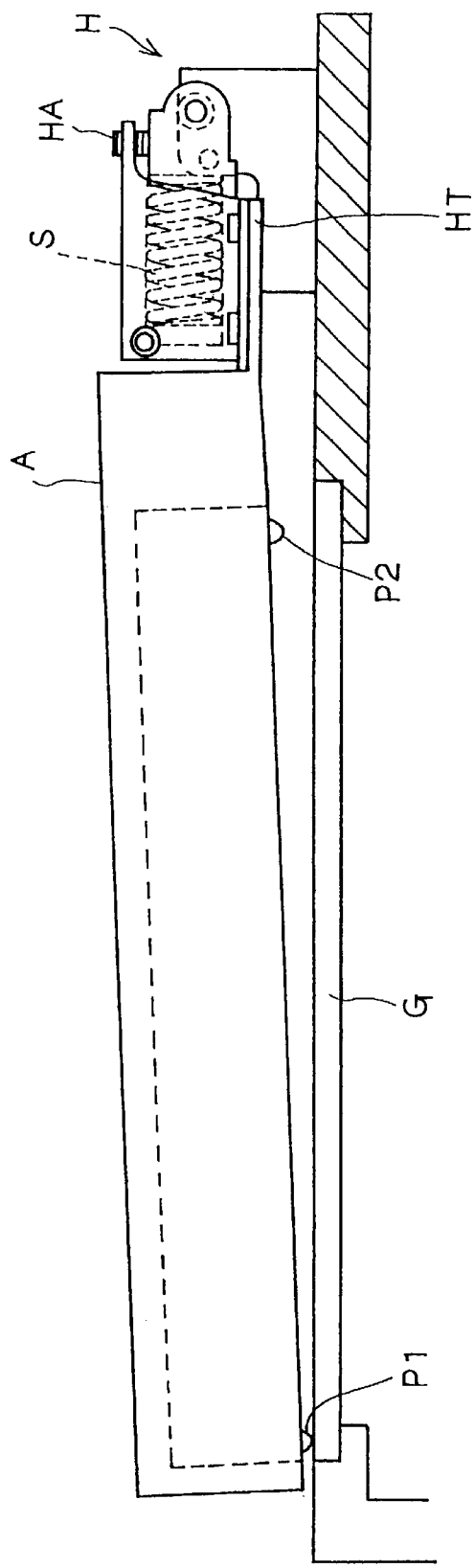
FIG. 8 is a drawing of the prior art.

FIG. 6 is a rear view of the motor mounting member 11 seen from the main hinge 2*a*. The separation feed motor 9 is attached via mounting parts 9*a*, 9*b*, 9*c* and 9*d* to the motor mounting member 11. The separation feed motor 10 is attached via mounting parts 10*a* and 10*b* to the motor mounting member 11.

Locations of the separation feed motor 9 and the transport motor 10 on the motor mounting member 11 are at both sides of the main hinge 2*a*.

Also, the separation feed motor 9 and the transport motor 10 are disposed to overlap the main hinge 2*a* in the height direction of the frame 8. In other words, about two-thirds of the separation feed motor 9 and three quarters of the transport motor 10 are overlapped within a range of height 1 above the main hinge 2*a* shown in FIG. 6. Bottom surfaces of the separation feed motor 9 and the transport motor 10 are adjacent to a top surface of the frame 8.

In FIG. 6, the main hinge 2*a* comprises a spring with an elastic force to an opening direction (not shown in the drawings), a hinge pin 45 as an axial shaft of the main hinge 2A, and a support pin 46 connecting the main hinge 2*a* to the main hinge mounting member 13*a*. The details of this hinge are substantially the same as those disclosed in Japanese Utility Model No. 2582475, so any further explanation is omitted.

As described above, because the separation feed motor 9 and the motor mounting member 11, which are relatively heavy parts, are arranged on both sides of the main hinge 2*a*, a weight balance on the main hinge 2*a* is stable. As a result, possibilities of twisting or deformation in the transport unit 5 and the reading aperture 8*c* are minimized. This ensures stable image reading and there is no need to use a stronger spring inside the main hinge 2*a*.

Furthermore, the separation feed motor 9 and the transport motor 10 mounted to the motor mounting member 11 overlap the main hinge 2*a* in the height direction of the frame 8. While it is possible to utilize a space around the main hinge effectively, it is also possible to reduce a height of the automated document feeder apparatus 1. An apparatus can be made lightweight and compact.

In the embodiment of the present invention, the main hinge 2*a* and the motor mounting member 11 are connected via the first connecting member 14, and the motor mounting member 11 and transport unit mounting member 12 are connected via the second connecting member 15 and the third connecting member 16. It is also acceptable to extend an upper surface of the mounting member 13 of the main hinge 2*a* to the transport unit 5 and attach the motor mounting member 11 and the transport unit mounting member 12 to this extension.

Furthermore, when the automatic document feeder apparatus 1 closes the platen glass on the image reading apparatus 100, i.e. the positioning protrusions 26*b* in the transport unit 5 abut against the platen glass 102, the connection among the main hinge 2*a*, the motor mounting member 11 and the transport unit mounting member 12 may be made such that the bending or deformation of the frame 8 will be minimized. Therefore, the connection among the main hinge 2*a*, the motor mounting member 11 and the transport unit mounting member 12 may be achieved just before the automated document feeder apparatus 1 is closed.

As described above, the sheet feeding apparatus of the present invention increases the strength of the frame made of a plastic and enables an accurate transportation of the originals without distortion of images thereon. It also uses the motor mounting portion as the frame reinforcement member to reduce a cost. Finally, the apparatus can be made lightweight and compact.

What is claimed is:

1. A sheet feeding apparatus disposed on an image reading apparatus to open and close an upper surface of said image reading apparatus, comprising:

a transport member for transporting a sheet to an image reading position;

a support frame made of a plastic for supporting the transport member and including a sheet stack unit to store sheets;

a hinge member attached to said support frame for opening and closing the support frame relative to the image reading apparatus;

a motor mounting member for supporting a motor driving the transport member, said motor mounting member being attached to the support frame between the hinge member and the transport member as a reinforcement of the support frame;

a first connecting member connected to the hinge member and the motor mounting member for connecting the same; and a second connecting member connected to the transport member and the motor mounting member for connecting the same.

2. A sheet feeding apparatus according to claim 1, further comprising an adjustment member disposed in the hinge member or a portion between the hinge member and the image reading apparatus for adjusting a distance between the image reading position and the transport member.

3. A sheet feeding apparatus according to claim 1, wherein further comprising a transmission member disposed between the motor mounting member and the transport member for transmitting a driving force of the motor to the transport member.

4. A sheet feeding apparatus disposed on an image reading apparatus to open and close an upper surface of said image reading apparatus, comprising:

a transport member for transporting a sheet to a first reading region on the image reading apparatus;

a sheet pressing plate disposed adjacent to the first reading region to press a sheet on a second reading region on the image reading apparatus;

a support frame made of a plastic for supporting the transport member and the sheet pressing plate;

a motor mounting member for supporting a motor to drive the transport member;

a first hinge member attached to the support frame at a transport member side so that said motor mounting member is attached to the support frame between the first hinge member and the transport member as a reinforcement a second hinge member attached to the support frame at a pressing plate side;

an elastic member attached to the first hinge member and having an elastic force higher than that of an elastic member of the second hinge member; and a connecting member for connecting the first hinge member and the motor mounting member on the support frame.

5. A sheet feeding apparatus, comprising:

a transport member for transporting a sheet to an image reading position;

a support frame made of a plastic for supporting the transport member and including a sheet stacker to store sheets;

hinge members attached to the support frame at a transport member side and a sheet stacker side to be spaced apart from each other to open and close the support frame relative to a main apparatus;

a first motor between said hinge members at the transport member side and the sheet stacker side to drive the transport member for transporting the sheet to a predetermined position;

a second motor for transporting the sheet from the predetermined position; and a motor mounting member for supporting the first motor and the second motor, said motor mounting member being attached to the frame as a reinforcement for the frame, said first and second motors being arranged on two sides of the hinge member at the transport member side.

6. A sheet feeding apparatus according to claim 5, wherein said hinge member at the transport member side is arranged with the first motor and the second motor to be overlapped with each other in a height direction.

7. A sheet feeding apparatus according to claim 5, wherein said hinge member at the transport member side has an elastic member for urging in an opening direction, and the hinge member at the sheet stacker side has an elastic member having an elastic force less than that formed at the transport member side for urging in the opening direction.

8. A sheet feeding apparatus according to claim 5, wherein said hinge member at the transport member side has an elastic member for urging in an opening direction, and said hinge member at the sheet stacker side does not have an elastic member.

9. An image reading apparatus, comprising:

image reading means for reading images on a sheet; and a sheet feeding apparatus disposed to open and close an upper surface of the image reading apparatus, said sheet feeding apparatus including:

a transport member for transporting the sheet to an image reading position of reading means;

a support frame made of a plastic for supporting said transport member and including a sheet stack unit to store the sheets;

a hinge member attached to said support frame for opening and closing the support frame relative to the sheet feeding apparatus;

a motor mounting member for supporting a motor driving the transport member, said motor mounting member being attached to the support frame between the hinge member and the transport member as reinforcement;

a first connecting member connected to the hinge member and the motor mounting member for connecting the same; and a second connecting member connected to the transport member and the motor mounting member for connecting the same.

10. An image reading apparatus according to claim 9, further comprising a transmission member disposed between the motor mounting member and the transport member for transmitting a driving force of the motor to the transport member.

11. A sheet feeding apparatus disposed on an image reading apparatus to open and close an upper surface of said image reading apparatus, comprising:

a transport member for transporting a sheet to an image reading position;

a support frame made of a plastic for supporting the transport member and including a sheet stack unit to store sheets;

a hinge member attached to said support frame for opening and closing the support frame relative to the image reading apparatus;

a motor mounting member for supporting a motor driving the transport member and a transport unit mounting member for supporting the transport member, said motor mounting member and said transport unit mounting member being joined together to form an angle member with a rectangular shape and attached to the support frame as a reinforcement of the support frame; and a connecting member connected to the hinge member and a middle portion of the angle member facing the hinge member for connecting the hinge member and the angle member.

12. A sheet feeding apparatus according to claim 11, further comprising a transmission member disposed inside the angle member for transmitting a driving force of the motor to the transport member.

13. A sheet feeding apparatus according to claim 11, wherein said connecting member is connected to the motor mounting member and the transport unit mounting member of the angle member.

14. A sheet feeding apparatus according to claim 11, further comprising an adjustment member attached to the transport member for adjusting a distance of the transport member relative to a platen of image reading means.

15. A sheet feeding apparatus according to claim 11, wherein said support frame has an opening at the image reading position extending perpendicular to a sheet transfer direction.

16. A sheet feeding apparatus according to claim 11, wherein connecting member includes a first connecting member connected to the hinge member and the motor mounting member, and a second connecting member connected to the transport member and the motor mounting member.

* * * * *